C. W. GRAHAM.
APPARATUS FOR USE IN CAN MAKING.
APPLICATION FILED OCT. 7, 1909.
970,704.
Patented Sept. 20, 1910.
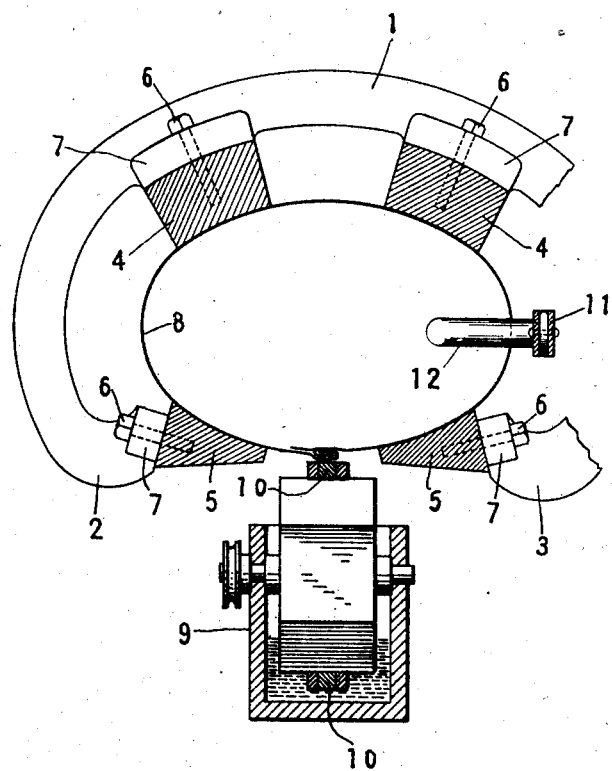
Witnesses:
Charles W. Graham, Inventor
By his Attorneys

UNITED STATES PATENT OFFICE.

CHARLES W. GRAHAM, OF ROME, NEW YORK, ASSIGNOR, BY MESNE ASSIGNMENTS, TO AMERICAN CAN COMPANY, OF NEW YORK, N. Y., A CORPORATION OF NEW JERSEY.

APPARATUS FOR USE IN CAN-MAKING.

970,704.  Specification of Letters Patent.  Patented Sept. 20, 1910.

Original application filed January 25, 1908, Serial No. 412,566. Divided and this application filed October 7, 1909. Serial No. 521,616.

*To all whom it may concern:*

Be it known that I, CHARLES W. GRAHAM, residing at Rome, in the county of Oneida, State of New York, have invented certain new and useful Improvements in Apparatus for Use in Can-Making, of which the following is a specification.

This invention relates to apparatus for use in making cans, and one of the objects thereof is to provide improved means engaging the outside of a can body for holding the can body with its edges in juxtaposed relation, for or during the operation of soldering or other treatment.

The subject-matter of the application is a division of my application Serial No. 412,566, filed January 25, 1908. Said application sets forth and specifically claims a mandrel upon and around which a can body is shaped or held. The matter divided out from said application and hereinafter described includes an apparatus which is adapted to surround and engage the outside of a can body to shape or hold it with its edges in juxtaposed relation and accessible for further treatment.

More specifically I aim to provide an apparatus adapted to engage the outside of a can body and hold it with its edges in position for soldering, together with soldering or other can treating devices, and means for presenting the can, held as stated, to the action of said device or devices.

Other objects of the invention, more or less broad than those above stated, will be in part obvious and in part specifically adverted to in the course of the following description.

The invention consists of the elements, combinations, and arrangements of parts, all as will be hereinafter fully set forth, and the scope of the application thereof will be indicated in the annexed claims.

In the accompanying drawing, which is to be taken as a part of this specification, and in which I have shown a merely illustrative form of embodiment of the invention, the figure is an elevation, partly in section, of apparatus including the invention.

Referring to the numerals on the drawing, 1 indicates a supporting member, preferably of recurved form, as shown, and having its ends 2 and 3 suitably spaced apart. Members similar to that shown are arranged in spaced series, and extending longitudinally thereof are upper and lower sets of rails 4 and 5. These rails in the present instance are secured as by means of screws 6 to laterally extending lugs 7. The rails 4 and 5, are so disposed and their inner surfaces suitably shaped to engage with the outside of a can body 8, and hold it with its edges in juxtaposed relation adjacent the space between the lower rails 5. The can body 8 is shown provided with a lock-and-lap seam, and it is to be understood that the present apparatus has particular utility and advantage in connection with can bodies of the lock-and-lap seam type. Nevertheless, no limitation is intended by such illustration, and I contemplate the use of the device with can bodies of other types than that shown. Furthermore, in the present instance rails 4 and 5 are so located upon the supporting members 1, and of such shape, that when they are in engagement with the outside of a can body the same will be caused to assume and be held in the form of an ellipse. In other words, the several distinct spaced surfaces which engage the can body form part of an imaginary geometrical figure, longitudinally extending, every right section through which is an ellipse. For the sake of brevity I will refer to this imaginary figure as a flattened cylinder. It is to be understood that this arrangement is not absolute, but only approximate, and I contemplate any arrangement which will produce substantially the results at which I aim. With this construction it is possible to bring the edge portions of the can into a condition of temporarily reduced convexity, against the resiliency thereof, ready for soldering, &c., with resulting advantages explained in my other application referred to. The present device, however, possesses advantages along similar lines, but superior to those claimed in said application. It will be understood, however, that I do not limit myself to a device capable of holding a can body of or in any particular shape; for instance, a round can body may be held unchanged in an apparatus properly constructed to that end. Whatever the embodiment, it is obvious that the can body may be made to assume or held in the proper position, with its edges juxtaposed and presented between the spaced ends of the supporting members, and if relative movement be now occasioned between the can body and some can treating means adjacent the presented part of the can, such as fluxing means, soldering means, wiping means, cleaning means, cooling means, &c., individually or in succession, the can body may be subjected to the action of such treating means while it is held within the outside supports. Can treating means are exemplified in the drawing by the solder-applying means, comprising a solder receptacle 9 and a flexible member 10 movable through the solder over rollers to transmit solder to the can seam presented between the ends 2 and 3 of the can holding members.

As a means for bringing about relative movement between the can body and the can treating means I may provide a chain 11, one course of which may run within the supporting member and carry a pin 12 for engagement with the can body, whereby the same may be moved along within the support while held in proper position by the longitudinally extending rails.

As many changes could be made in the above construction, and many apparently widely different embodiments of this invention could be made without departing from the scope thereof, it is intended that all matter contained in the above description or shown in the accompanying drawing shall be interpreted as illustrative, and not in a limiting way, except as the following claims shall require.

Having thus described my invention what I claim as new and desire to secure by Letters Patent is:

1. In a device of the class described, in combination, a can receiving member having longitudinally extending surfaces engaging the outside of a can body, said surfaces forming part of an imaginary flattened cylinder, and means for moving the can body along said surfaces.

2. In a device of the class described, in combination, a can receiving member having distinct longitudinally extending surfaces engaging the outside of a can body, said surfaces being spaced and forming part of an imaginary flattened cylinder, and means extending between spaced surfaces for moving the can body along said surfaces.

3. In a device of the class described, in combination, a can receiving member having distinct longitudinally extending surfaces engaging the outside of a can body, said surfaces being spaced and forming part of an imaginary flattened cylinder, and means in the space between two of said surfaces adapted to apply solder to the can engaged thereby.

4. In a device of the class described, in combination, a can receiving member having distinct longitudinally extending surfaces engaging the outside of a can body, said surfaces being spaced and forming part of an imaginary flattened cylinder, means in the space between two of said surfaces adapted to apply solder to the can engaged thereby, and means for moving the can body along said surfaces.

5. In a device of the class described, in combination, a can receiving member having distinct longitudinally extending surfaces engaging the outside of a can body, said surfaces being spaced and forming part of an imaginary flattened cylinder, the space between said surfaces being to one side of the longitudinal plane cutting the flattened cylinder in its line of greatest width, and a solder applying means operative in said space.

In witness whereof, I affix my signature in the presence of two witnesses.

CHARLES W. GRAHAM.

Witnesses:
B. W. COULDOCK,
ADELE HONIGSBERG.